Feb. 6, 1934.  C. HUEBSCHLE  1,946,075
ANTHROPOMETER
Filed June 2, 1931   2 Sheets-Sheet 1
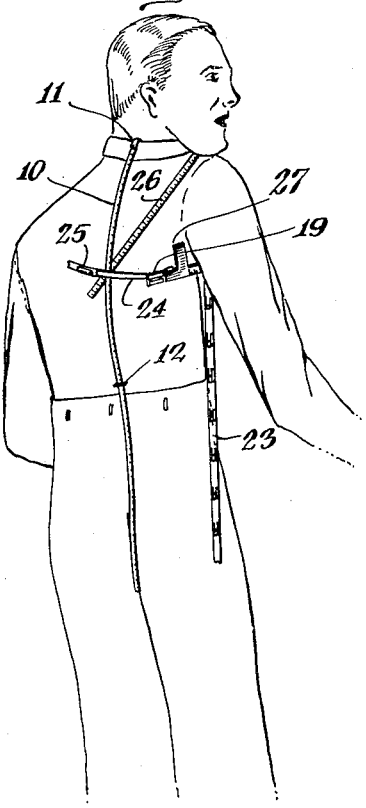
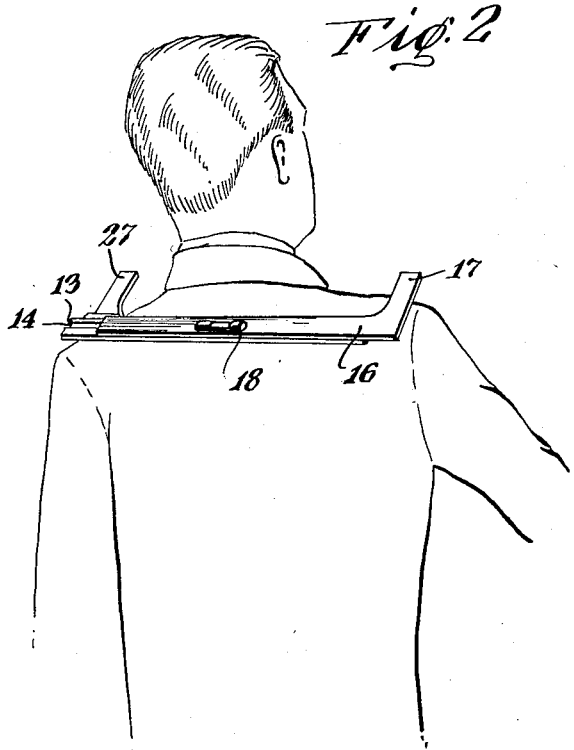
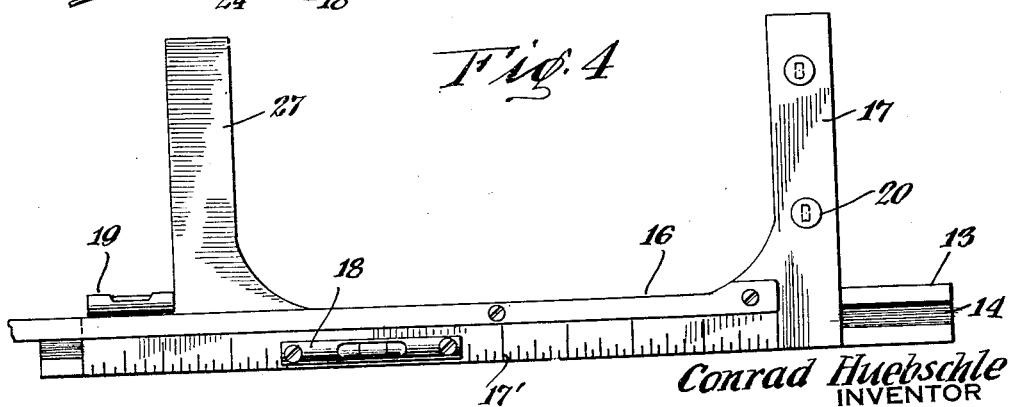
Conrad Huebschle
INVENTOR
BY ATTORNEY Feb. 6, 1934. C. HUEBSCHLE 1,946,075
ANTHROPOMETER
Filed June 2, 1931 2 Sheets-Sheet 2
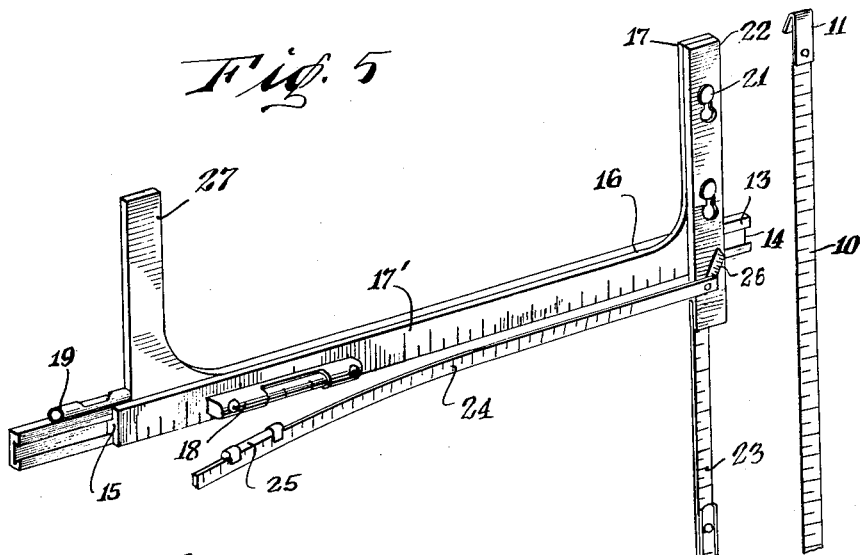
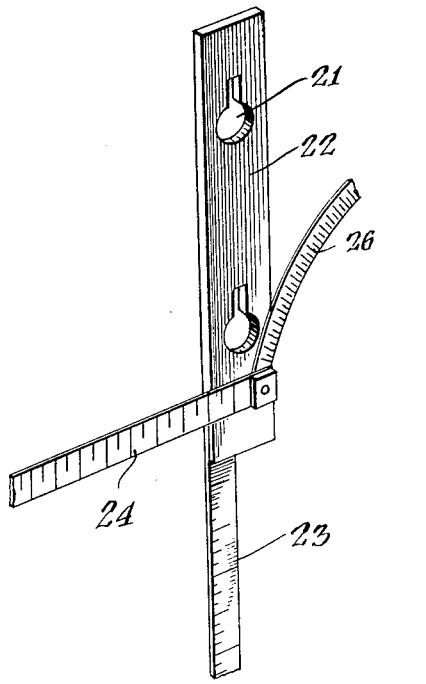
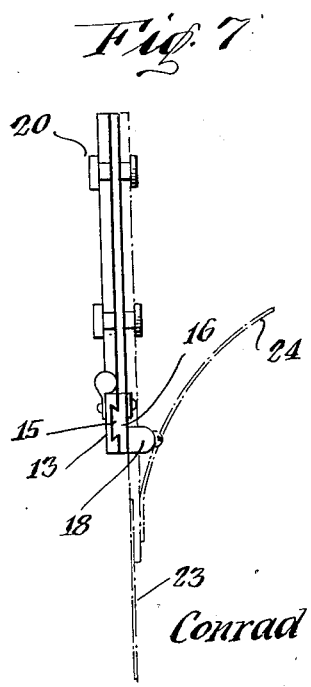
Conrad Huebschle
INVENTOR
BY ATTORNEY Patented Feb. 6, 1934

1,946,075

UNITED STATES PATENT OFFICE 1,946,075

ANTHROPOMETER

Conrad Huebschle, Cincinnati, Ohio

Application June 2, 1931. Serial No. 541,561

1 Claim. (Cl. 33—7)

This invention relates to improvements in measuring instruments, particularly to an anthropometer, and it is the principal object of my invention to provide an instrument of this type enabling a clothing designer or tailor to furnish well fitting clothes by enabling him to accurately measure abnormal or irregular body formations.

Another object of my invention is the provision of a measuring instrument of comparatively simple and inexpensive construction, yet durable and highly efficient in its operation.

A further object of my invention is the provision of a tailor's measure including tape, strap, blade, rule measures, and gages allowing an accurate measuring by salesmen for instance for mail order houses etc., so that alterations in ready to wear clothes are avoided altogether or restricted to a minimum.

A still further object of my invention is the provision of a measuring instrument indicating the degree of shoulder slope and back and chest measures deviating from normal.

These and other objects and advantages of my invention will appear as the description thereof proceeds, and will then be specifically defined in the appended claim.

In the accompanying drawings forming a material part of this disclosure:

Fig. 1 is a perspective view illustrating the use of an anthropometer constructed according to my invention.

Fig. 2 is a similar view showing the use of the implement as a shoulder measuring device.

Fig. 3 is an edge elevational view of the instrument.

Fig. 4 is a top plan view thereof.

Fig. 5 is a perspective view of the instrument combined with a body measure, either foldable rod or tape.

Fig. 6 is a fragmentary perspective view of the body measure.

Fig. 7 is an edge view thereof.

As illustrated, my anthropometer comprises a tape measure 10 attachable at its upper end by means of a hook 11 to the collar of a person, and secured intermediate its ends by a clamp 12 to the clothing, this tape being used to ascertain the distance between the collar, waist and hips at the back.

The instrument also comprises a bar 13 provided with a dove-tail groove 14, in which is guided a slide 15 on the under surface of a bar 16, each bar respectively having right angular arms 17, 27. The bar 16 is provided with appropriate graduations 17' on its front face, and a spirit level 18, while the upper edge of bar 13 near one end thereof carries a similar level 19.

The arm 17 is equipped with buttons 20 adapted to be passed through button holes 21 in an attachment member 22 from which depends a foldable measuring rod 23, by which the distance between the arm pit, waist and hip at the sides may be obtained while a flexible graduated blade measure 24 is attached at one end to member 22 and carries at its other end a spirit level 25, these several levels indicating to the operator when the elements to which they are attached are in true horizontal positions.

A graduated flexible tape or strap 26 is used to ascertain the other shoulder and arm measures.

The operation of my device is considered apparent from the above description, and by having reference to the drawings and it will be understood, that according to the measurements taken a designer or tailor is able to make clothes which have a perfect fit. In use the instrument is either held under the arm as indicated in Figure 1 or laid across the shoulders as indicated in Figure 2 whereby their width may be measured.

It will be understood that I have described and shown the preferred form of my device only and that I may make such changes therein as come within the scope of the appended claim without departure from the spirit of my invention.

Having thus described my invention, what I claim as new and desire to secure by Letters Patent is:

An anthropometer comprising a pair of interengaged, longitudinally slidable bars, each bar having a single arm extending at a right angle from its upper edge in parallel one with the other, one of said arms having two spaced rigid buttons and its bar being graduated, a strip having key hole shaped openings to engage said buttons, a foldable graduated rod extending lengthwise downwardly from said strip, a graduated blade adjustably fixed to said strip, and means carried by said bars and blade to indicate when they are level.

CONRAD HUEBSCHLE.